United States Patent Office 3,246,008
Patented Apr. 12, 1966

3,246,008
REACTION PRODUCTS OF OZONIZED FATTY ACIDS AND ALKYLENE POLYAMINES
Edward Dwight Evans and Charles Howard Hopkins, Pawhuska, Okla., assignors to Skelly Oil Company, Tulsa, Okla., a corporation of Delaware
No Drawing. Filed Oct. 3, 1961, Ser. No. 142,493
5 Claims. (Cl. 260—309.6)

This invention relates to novel chemical reaction products and to methods for preparing the novel chemical products which are adapted to be incorporated in bituminous substances such as asphalt to impart thereto improved bonding characteristics.

Bitumen, asphalt, tar and similar asphaltic or bituminous substances are frequently mixed with mineral aggregates such as chips, sand, rock or similar materials to cement the aggregate bodies in a smooth concrete-like paving composition which is utilized for the preparation of roads, dams, airport runways and other structures. In addition, these bituminous substances are frequently employed as coating materials on metals such as pipes and other types of exposed structural parts to waterproof and to protect against corrosion.

In all such applications it is desired that the bituminous substances form a tenacious bond with the material to which it is applied. It has long been recognized that in the construction of asphalt pavements, water has a detrimental effect on the strength of the bond between the asphalt and mineral aggregate. If the aggregate is wet at the time of application of the asphalt thereto, coating of the aggregate by the asphalt is incomplete. If the coated aggregate is exposed to water shortly after it is coated with the asphalt, separation of the asphalt from the aggregate tends to occur.

To improve the coating and bonding qualities of bituminous compositions several types of chemical additives have been proposed. These chemical additives are generally referred to in the art as anti-strippants or anti-stripping agents. The anti-stripping agents promote initial adhesion of the asphalt to the aggregate during road construction and cause the asphalt to retain its adhesion to the aggregate after the road has been built. Without the anti-stripping additives, asphalt may be displaced from aggregate in the road because of ground water and because of the combination of traffic action and rain. Likewise, the anti-stripping agents serve to improve the coating properties of the asphalts when employed in various waterproofing operations, such as canal linings, concrete dampproofing and pipeline coatings.

These asphalt anti-stripping agents must possess a number of desired properties if they are to be acceptable for widespread use. An asphalt anti-stripping additive must be soluble in asphalt, and must not separate on standing. It should have a relatively low melting point, that is, a melting point below about 150° F. and it should not decompose when stored for moderate periods of time at a temperature at which it can be readily pumped and blended. An asphalt anti-stripping agent must have surface-active properties, that is, it must lower the interfacial tension between oil and water. This surface active property should be great enough to promote adhesion between the asphalt and aggregate at low concentration of the additive so as not to adversely affect the other physical properties of the asphalt. The amount of additive used should be less than about 2% by weight of the treated asphalt. Moreover, the anti-stripping agent should also have enough heat stability to retain its effectiveness after the treated asphalt has been stored for several days at temperatures on the order of about 300° F. The present invention provides novel reaction products of unsaturated fatty acids which are adapted for incorporation into bituminous substances to impart thereto improved bonding characteristics. The present invention relates also to the method of preparing these new products and to bituminous compositions containing the additives in amounts sufficient to confer improved bonding or anti-stripping properties to the bituminous composition.

Briefly stated, the new anti-stripping additives of the present invention are produced by treating a relatively long chain unsaturated aliphatic acid with certain oxidizing agents, particularly ozone, followed by condensation of the thus-modified acid at elevated temperatures with an alkylene polyamine. The new reaction products of unsaturated fatty acids of the present invention possess all of the above-defined properties desired in an anti-stripping additive for bituminous substances such as asphalt.

To prepare the novel products of the present invention an unsaturated fatty acid is treated with ozone, which readily reacts with the unsaturated acid at the location of the double bonds to form an ozonide. This reaction is carried out at room temperatures utilizing a sufficient amount of ozone to incorporate oxygen in the unsaturated fatty acid material in an amount from about 0.5 to not more than about 6.0% and preferably from 1.5% to 3% by weight. Utilizing oleic acid as a representative acid, this ozonization reaction may be represented thus:

(I)

$$CH_3(CH_2)_7CH=CH-(CH_2)_7-\overset{O}{\underset{OH}{C}}+O_3 \longrightarrow$$

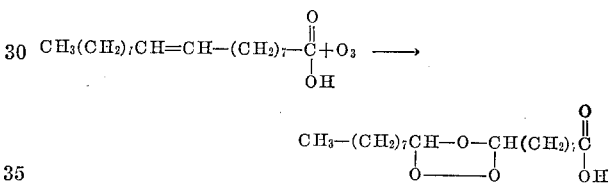

The above ozonized fatty acid is then reacted at an elevated temperature with an alkylene polyamine. The amount of the alkylene polyamine employed is in excess of the amount theoretically required for reaction with the carboxyl groups present in the acid and ranges from about 125 to 200% by weight theoretical and preferably from about 125 to 175% by weight theoretical. The reaction is carried out at elevated temperatures on the order of about 120 to 250° C. and preferably from 185 to 250° C. It is believed that the alkylene polyamine reacts with the carboxyl radicals of the ozonized fatty acid to form amine soaps which at the elevated temperatures employed, are dehydrated to amides. The resulting amides in turn condense with the evolution of water to form imidazolines. The amount of polyalkylene amine which is in excess of that required for reaction with the carboxyl group of the acid reacts with the ozonized fatty acid at the location of the ozonide structure to introduce an amine nitrogen group into the fatty acid hydrocarbon chain. In this manner two hydrophilic amine nitrogen groups are provided in the acid molecule.

The overall reaction involved may be expressed as follows, oleic acid and diethylene triamine being used as representative unsaturated fatty acids and polyamines.

(II)

$$CH_3(CH_2)_7CH-O-CH-(CH_2)_7-\overset{O}{\underset{OH}{C}}+2NH_2-C_2H_4-NH-C_2H_4NH_2 \longrightarrow$$

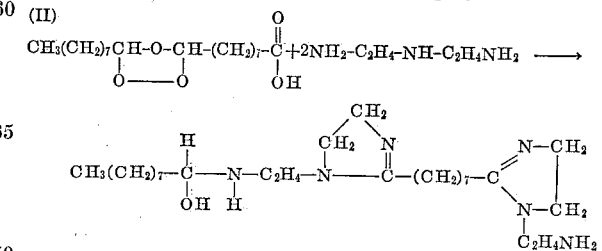

Any ethylenically unsaturated or polyunsaturated acid having from about 10 to 22 carbon atoms is suitable for use as the starting material in preparing the reaction products of the present invention. Suitable acids thus include oleic, linoleic, hypogaeic, erucic, linolenic, eleaostearic, licanic and the like. Vegetable, animal and marine oils can be used as a source of these fatty acids. Also, commercially available mixtures of such unsaturated acids can be employed, the acid mixture composing tall oil being a preferred starting material for use in the present invention. Tall oil which is available commercially in various grades is a liquid resin obtained from digesting wood to wood pulp in the paper industry. It is a dark brown viscous liquid with the acid components thereof consisting essentially of 14 to 18 carbon acids. The unsaturated acids oleic and linoleic acids are the predominant acid components. Myristic acid, palmitic acid, heptadecanoic acid, stearic acid, and linolenic acid are usually present as minor comnstituents. The rosin acids, if any, are present only in small amounts.

The alkylene polyamines that are employed in the present invention for reaction with the ozonized fatty acid are those containing at least two amine groups to the molecule. Examples of such alkylene polyamines that are satisfactory for the purpose are ethylene diamine, propylene diamine, diethylene triamine triethylene tetramine and the like.

The imidazoline type anti-stripping agent which is the reaction product of the reaction shown in Equation II above can then be reacted with additional quantities of unsaturated aliphatic acids, which acids may be either ozonized or unozonized to form imidazoline-amide type products which are also effective anti-stripping agents for asphalt. Such reaction products are also included within the scope of the present invention. The production of these imidazoline-amide type reaction products is illustrated by the following reaction.

125° F. for 1 hour. After 1 hour, the excess water is removed by decanting the water through a screen placed over the top of the beaker, then shaking the aggregate to remove any free water. The wet aggregate is then placed in an 8 oz. tin and 6 grams of the treated cutback asphalt is weighed into the tin. The aggregate-asphalt mixture is stirred with a spatula for 3 minutes to insure coating of the aggregate, then the aggregate is placed on 4 x 4 inch glass plate and allowed to cure at room temperature for 1 hour. After the curing period, the glass plate and coated aggregate is placed in a pan containing enough distilled water to completely cover the aggregate, and allowed to stand for 1 hour. After 1 hour in the distilled water, the percent of asphalt coating the aggregate is visiually estimated. 95% coating is required to pass the test.

This test plus two modifications of the test was employed in evaluating the anti-stripping additives of this invention. In the first modification, the additives were mixed with a standard RC–2 or MC–3 cutback asphalt in varying proportions and tested by the Kansas Stripping Test, without running the storage test, i.e. 72 hours at 300° F. If the additive gave good results on the preliminary test, is could then be checked for heat stability by rerunning the test after the asphalt-additive mixture had been stored for 72 hours at 300° F. The second modification of the test procedure involved the use of a limestone aggregate in lieu of the standard siliceous type aggregates.

EXAMPLE I

Approximately 25 grams of a tall oil fatty acid mixture containing approximately 46% linoleic, 51% oleic and 3% saturated acids was dissolved in from about 5 to 10 times its volume of a saturated hydrocarbon solvent (III)

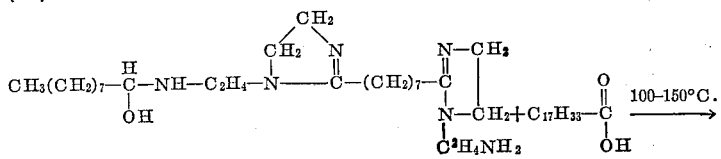

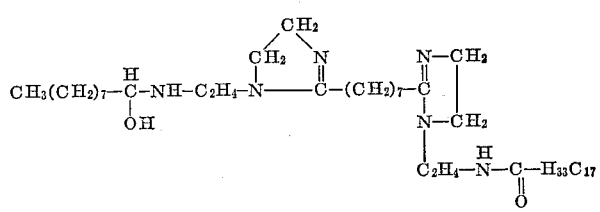

The invention will be further characterized by the following specific embodiments which illustrate the preparation of the novel anti-stripping agents contemplated by the instant invention and their effectiveness as anti-stripping additive for bituminous substances.

In the following examples, the new products were evaluated as anti-stripping additives for asphalt utilizing the State of Kansas Stripping Test (TS–75) or a modification of this test. Briefly, this test requires that 100 grams of cut-back asphalt and anti-stripping additive be thoroughly mixed, and stored at 300° F. for 72 hours in an 8 oz. paint can. At the end of the storage period, the asphalt-additive mixture is cooled to 125° F., and 6 grams of the mixture is mixed with 100 grams of standard aggregate. The standard aggregate is prepared for the test by weighing 100 grams into a 250 ml. beaker, covering the aggregate with distilled water and storing at (Skellysolve "C"). Ozone was bubbled through the solution at atmospheric pressure and room temperature for varying periods of time, ranging from 7.5 minutes to 1 hour. This rate of ozonization incorporated ozone into the acid molecule in amounts ranging from 0.75% by weight for 7.5 minutes to 6% for 1 hour.

The ozonized tall oil fatty acid mixture was then reacted with an alkylene polyamine by heating the polyamine to 180° C. and adding the ozonized fatty acid-solvent mixture thereto very slowly over a 2 to 3 hour period. The alkylene polyamine was employed in varying amounts ranging from 125 to 200% of that theoretically required for reaction with the carboxyl groups of the fatty acids. The solvent and water formed by the condensation was flashed off during this reaction period. After all the fatty acid solution had been added the product was heated to 250° C. and maintained at that temperature for one hour to insure complete reaction.

EXAMPLE II

Utilizing the procedure of Example I a number of additives were prepared for erucic and ethylene diamine. The amount of ozone incorporated in the acid was varied as shown below, while in each case the amount of ethylene diamine was approximately 125% of theoretical. The RC–2 cutback asphalt was made using 72% by weight of a 70–85 penetration asphalt and 28% naphtha diluent. The results were as follows:

*Kansas Stripping Test (TS–75) (the heat stability portion of the test omitted)*

| Additive | Compound Used as Acid | Number Double bonds | O₃ Used, Wt. percent | Percent Additive in RC-2 | Percent Coating Siliceous Aggregate |
|---|---|---|---|---|---|
| A | Erucic Acid | 1 | 0 | 0.2 | 90 |
| B | ---do--- | 1 | 1.5 | 0.2 | 92 |
| C | ---do--- | 1 | 3.0 | 0.2 | 97 |
| D | ---do--- | 1 | 4.5 | 0.2 | 99 |
| E | ---do--- | 1 | 6.0 | 0.2 | 45 |

EXAMPLE III

Utilizing the procedure of Example I, the four anti-stripping additive were prepared from distilled tall oil (46% linoleic, 51% oleic, 3% saturated acids) and ethylene diamine. The amount of ozone added to the tall oil was varied as shown below, while in each case the amount of ethylene diamine was approximately 170% of theoretical. The same RC-2 cutback asphalt as above was employed. The results were as follows:

*Kansas Stripping Test (TS–75) (the heat stability portion of the test omitted)*

| Additive | O₃ Used, Wt. Percent | Percent Additive in RC-2 Asphalt | Percent Coating, Siliceous Aggregate |
|---|---|---|---|
| F | 1.5 | 0.2 | 98 |
| G | 3.0 | 0.2 | 99+ |
| H | 4.5 | 0.2 | 97 |

EXAMPLE IV

Utilizing the procedure as in Example I, anti-stripping additives were prepared from distilled tall oil and diethylene triamine. The diethylene triamine was employed in an amount corresponding to about 125% theoretical. These reaction products were tested as anti-stripping additives in an MC-3 cutback asphalt which consisted of 79% by weight of a 150–200 penetration asphalt and 21% kerosene diluent. The results were as follows:

| Additive | Wt. Percent, O₃ in Additive | Percent Additive in MC-3 Asphalt | Percent Coating |
|---|---|---|---|
| J | 1.5 | 0.3 | 98 |
|   |     | 0.4 | 99 |

EXAMPLE V

Reaction products as prepared in Example IV were further reacted with unsaturated fatty acids. The results of stripping tests run with this type of additive are shown below:

| Additive | Percent Mixture in MC-3 Asphalt | Percent Coating Siliceous | Percent Coating Limestone |
|---|---|---|---|
| K (55.5% J+44.5 Unsaturated Fatty Acid) | 0.4 | 97.5 | 40 |
| L (50% J+50.0 Unsaturated Fatty Acid) | 0.4 | 99–100 | 98 |
| M (33.3% J+66.7 Unsaturated Fatty Acid) | 0.4 | 97 | 98 |

EXAMPLE VI

To determine the heat stabilty of the additives a number of the anti-stripping additives were heated for 72 hours at 300° F. The results of the stripping tests on the experimental additive-asphalt blends after they had been stored at 300° F. for 72 hours are shown below:

| Additive | Asphalt Cutback | Percent Additive in Cutback | Percent Coating on Standard Aggregate |
|---|---|---|---|
| C | RC-2 | 0.4 | 99+ |
| J | MC-3 | 0.4 | 99–100 |
| K (55.5% J+44.5% Unsaturated Fatty Acid) |  | 0.4 | 99–100 |

As seen from the foregoing results, when suitable quantities of the reaction products of the invention, usually from 0.15 to 1.0% by weight are incorporated in the asphalt it confers on the asphalt the ability to effectively coat wet aggregates. The improved coating and bonding properties of the asphalt are retained even when it is maintained at elevated temperatures for extended periods of time. In fact, it has been found that the effectiveness of the present compounds is sometimes enhanced by heating the asphalt composition due to the fact that the chemical reaction which forms the anti-stripping agents initially is rather slow and the period during which they are maintained at elevated temperatures permits the reaction to go to completion. This is seen in the above results in the case of additive K (55.5% J+44.5% unsaturated fatty acid).

The results of the asphalt stripping tests shown herein illustrate the anti-stripping characteristics of the additives of this invention. By varying the extent of ozonation the additive characteristics can be matched to the aggregate and to the asphalt which is to be used. This is a particularly advantageous feature since aggregates from different geographical areas seldom have exactly the same stripping characteristics.

The anti-stripping agents of the present invention can be incorporated in bituminous compositions used in the preparation of paving compositions containing the usual types of aggregates such as gravel, crushed stone, sand, slag and the like. Moreover, these aggregates can be employed in either wet or dry condition. Bituminous compositions containing these new anti-stripping agents can be employed as coatings on metals, wood, or other structural materials exposed to water under conditions which tend to cause a loss of strength of the bituminous bond.

Those modifications and equivalents which fall within the spirit of the invention and the scope of the appended claims are to be considered part of the invention.

We claim:

1. A product resulting from the process which comprises subjecting an ethylenically unsaturated acid of 10 to 22 carbon atoms to the action of ozone for a time sufficient to form an ozonide at the location of the unsaturated carbon-to-carbon bonds in the acid molecule and to incorporate oxygen therein in an amount from about about 0.5 to about 6% by weight, then reacting at a temperature ranging from about 120 to 250° C. and for a time of about 2 to 3 hours to form a reaction product said ozonized unsaturated acid with an alkylene polyamine selected from the group consisting of ethylenediamine and polyethylene polyamines having up to 5 ethylene groups, the said alkylene polyamine being employed in an amount from about 25 to 100% in excess of that required for reaction with the carboxyl groups of said acid.

2. A product resulting from the process which comprises subjecting tall oil acid mixtures consisting essentially of unsaturated fatty acids of 14 to 18 carbon atoms to the action ozone for a time sufficient to form an ozonide at the location of the unsaturated carbon-to-carbon bonds in the tall acid mixtures and to incorporate oxygen therein in an amount from about 0.5 to about 6% by weight, then reacting at a temperature ranging from about 120 to 250° C. and for a time of about 2 to 3 hours to form a reaction product said ozonized acid mixtures with an alkylene polyamine selected from the group consisting of ethylenediamine and polyethylene polyamines having up to 3 ethylene groups, the said alkylene polyamine being employed in an amount from about 25 to 100% in excess of that required for reaction with the carboxyl groups of said acid.

3. A product resulting from the process which comprises subjecting tall oil fatty acid mixtures consisting essentially of unsaturated fatty acids of 14 to 18 carbon atoms to the action of ozone for a time sufficient to form an ozonide at the location of the unsaturated carbon-to-carbon bonds in the tall oil acid mixtures and to incorporate oxygen therein an in amount from about 0.5 to about 6% by weight, then reacting at a temperature ranging from about 120 to 250° C. and for a time of about 2 to 3 hours to form a reaction product said ozonized acid mixtures with diethylenetriamine, the said diethylenetriamine being employed in an amount from about 25 to 100% in excess of that required for reaction with the carboxyl groups of said acid.

4. A product resulting from the process which comprises subjecting tall oil acid mixtures consisting essentially of unsaturated fatty acids of 14 to 18 carbon atoms to the action of ozone for a time sufficient to form an ozonide at the location of the unsaturated carbon-to-carbon bonds in the tall oil acid mixtures and to incorporate oxygen therein in an amount from about 0.5 to about 6% by weight, then reacting at a temperature ranging from about 120 to 250° C. and for a time of about 2 to 3 hours to form a reaction product said ozonized acid mixtures with ethylenediamine, the said ethylenediamine being employed in an amount from about 25 to 100% in excess of that required for reaction with the carboxyl groups of said acid.

5. A product resulting from the process which comprises subjecting an ethylenically unsaturated acid of 10 to 22 carbon atoms to the action of ozone for a time sufficient to form an ozonide at the location of the unsaturated carbon-to-carbon bonds in the acid molecule and to incorporate oxygen therein in an amount from about 0.5 to about 6% by weight, then reacting at a temperature ranging from about 120 to 250° C. for a time of about 2 to 3 hours to form a reaction product said ozonized unsaturated acid with an alkylene polyamine selected from the group consisting of ethylenediamine and polyethylene polyamines having up to 3 ethylene groups, the said alkylene polyamine being employed in an amount from about 25 to 100% in excess of that required for reaction of carboxyl groups in said acid, and then reacting at an elevated temperature and for a time sufficient to form a reaction product the resulting ozonized acid-alkylene polyamine product with an additional quantity of an ethylenically unsaturated aliphatic acid of from 10 to 22 carbon atoms.

References Cited by the Examiner

UNITED STATES PATENTS

| | | | |
|---|---|---|---|
| 1,958,529 | 5/1934 | Bockmuhl et al. | 260—309 |
| 2,149,473 | 3/1939 | Sonn | 260—309 |
| 2,361,488 | 10/1944 | Mikeska | 106—273 |
| 2,635,079 | 4/1953 | Valko et al. | 260—309.6 |
| 2,744,888 | 5/1956 | Carnes et al. | 260—97.5 |
| 2,766,132 | 10/1956 | Blair et al. | 106—273 |
| 2,792,431 | 5/1957 | Niebling et al. | 260—339 |
| 2,846,440 | 8/1958 | Hughes | 260—309.6 |
| 2,862,940 | 12/1958 | Otsuki et al. | 260—339 |
| 2,865,937 | 12/1958 | Maggiolo | 260—413 |
| 2,894,848 | 7/1959 | Goodwin et al | 106—281 |
| 2,897,231 | 7/1959 | Niegowski et al. | 260—339 |
| 2,906,635 | 9/1959 | Teot | 106—273 |
| 2,954,359 | 9/1960 | Karabinos et al. | 260—97.5 |

FOREIGN PATENTS

| | | |
|---|---|---|
| 810,571 | 3/1959 | Great Britain. |

OTHER REFERENCES

Long Chemical Reviews, vol. 27, pp. 455–59 (1940).

Maggiolo et al. In: Ozone Chemistry and Technology, pp. 200–201 (vol. 21 of Advances in Chemistry Series) Washington, D.C., Amer. Chem. Soc., 1959.

The Condensed Chemical Dictionary, 5th ed., pp. 949 and 1061, N.Y., Reinhold, 1956.

IRVING MARCUS, *Primary Examiner.*

JOSEPH REBOLD, NICHOLAS S. RIZZO, WALTER A. MODANCE, *Examiners.*